US007796508B2

(12) United States Patent
Hariharan et al.

(10) Patent No.: US 7,796,508 B2
(45) Date of Patent: Sep. 14, 2010

(54) METHOD OF GENERICALLY SPECIFYING CONGESTION CONTROL AND AVOIDANCE BEHAVIOR

(75) Inventors: Seeta Hariharan, Raleigh, NC (US); Sridhar Rao, Raleigh, NC (US); Sreekrishnan Venkateswaran, Kerala (IN); Nicholas M. Williamson, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 12/131,489

(22) Filed: Jun. 2, 2008

(65) Prior Publication Data
US 2008/0232257 A1 Sep. 25, 2008

Related U.S. Application Data

(63) Continuation of application No. 10/706,231, filed on Nov. 12, 2003, now abandoned.

(51) Int. Cl.
*G01R 31/08* (2006.01)
(52) U.S. Cl. ...................... 370/229; 709/223
(58) Field of Classification Search .......... 370/229–240
See application file for complete search history.

(56) References Cited

U.S. PATENT DOCUMENTS

| 5,243,596 | A | | 9/1993 | Port et al. | |
|---|---|---|---|---|---|
| 5,274,782 | A | | 12/1993 | Chalasani et al. | |
| 5,519,689 | A | * | 5/1996 | Kim | 370/232 |
| 5,790,522 | A | * | 8/1998 | Fichou et al. | 370/236 |
| 5,870,561 | A | | 2/1999 | Jarvis et al. | |
| 6,314,618 | B1 | | 10/2000 | Herbert | |
| 6,188,759 | B1 | | 2/2001 | Lorenzen et al. | |
| 6,243,449 | B1 | | 6/2001 | Margulis et al. | |
| 6,577,596 | B1 | * | 6/2003 | Olsson et al. | 370/230 |
| 6,633,569 | B2 | * | 10/2003 | Hemmady | 370/398 |
| 7,120,165 | B2 | * | 10/2006 | Kasvand-Harris et al. | 370/466 |
| 2002/0080720 | A1 | * | 6/2002 | Pegrum et al. | 370/236 |
| 2003/0126223 | A1 | | 7/2003 | Jenne et al. | |
| 2003/0126280 | A1 | | 7/2003 | Yao et al. | |
| 2003/0206528 | A1 | * | 11/2003 | Lingafelt et al. | 370/238 |
| 2005/0114540 | A1 | * | 5/2005 | Hariharan et al. | 709/232 |

* cited by examiner

*Primary Examiner*—Chi H Pham
*Assistant Examiner*—Fan Ng
(74) *Attorney, Agent, or Firm*—Yee & Associates, P.C.; Mark E. McBurney

(57) ABSTRACT

A method for controlling congestion control and avoidance behavior of a plurality of heterogeneous network processors in a network is disclosed. The network also includes at least one host processor that utilizes at least one congestion control application. The method include providing a plurality of generic application program interfaces (APIs). The generic APIs communicate with the congestion control application(s) and the heterogeneous network processors. The generic APIs communicate with the congestion control application(s) in the host processor(s) in a network processor independent manner, but manage the congestion control and avoidance behavior of the heterogeneous network processors in a network processor specific manner. Thus, the generic APIs allow the control application(s) to be network processor independent and to manage the congestion control and avoidance behavior of the heterogeneous network processors in the network processor specific manner.

12 Claims, 5 Drawing Sheets

US 7,796,508 B2

METHOD OF GENERICALLY SPECIFYING CONGESTION CONTROL AND AVOIDANCE BEHAVIOR

CROSS-REFERENCE TO RELATED APPLICATIONS

Under 35 USC §120, this application is a continuation application and claims the benefit of priority to U.S. patent application Ser. No. 10/706,231 filed Nov. 12, 2003, now abandoned entitled "System for Generically Specifying Congestion Control and Avoidance Behavior", all of which is incorporated herein by reference.

FIELD OF THE INVENTION

The present invention relates to computer systems, and more particularly to a method for providing a mechanism for allowing a host to manage congestion control and avoidance behavior of a network processor in a scalable, flexible manner.

BACKGROUND OF THE INVENTION

Driven by increasing usage of a variety of network applications, such as those involving the Internet, computer networks are of increasing interest. In order to couple portions of a network together or to couple networks together, network processors residing in switches, routers, and/or other components are typically used. In order to adequately control the traffic through the network, the behavior of each network processor is controlled to determine its actions in the event of congestion and to attempt to avoid congestion. Congestion occurs for a particular network processor when the network processor may drop packets, for example because the network processor receives more packets in a particular interval than can be queued or transmitted. The action(s) that a particular network processor is to take in the event of congestion may change depending upon the network. Thus, a network administrator typically desires to manage the congestion control and avoidance behavior of the network processors.

FIG. 1 depicts a block diagram of a conventional system 10 for managing congestion control and avoidance of network processors. The system 10 includes a conventional host processor 10 used by a network administrator and conventional network processors 30, 40, and 50. The conventional host processor 10 typically includes a conventional congestion control application 22 that is developed at least in part by the owner of the conventional system 10. The network administrator uses the conventional congestion control application 22 to manage the congestion control and avoidance behavior of the conventional network processors 30, 40, and 50 in the conventional system 10.

The conventional network processors 30, 40, and 50 are typically purchased by the owner of the conventional system 10. The conventional network processors 30, 40, and 50 each includes conventional software and/or firmware 32, 42, and 52, respectively, that may be different. For example, the conventional network processors 30, 40, and 50 may include different versions of a particular model of network processor from a particular vendor and/or other model(s) of network processor that may be from other vendors. Thus, the conventional network processors 30 and 40 are depicted as having software and/or firmware 32 and 42 that are different versions of a Model X network processor, while the software and/or firmware 52 of the conventional network processor 50 is a Model Y network processor. Because the conventional network processors 30, 40, and 50 are designed to communicate with different control applications, each conventional network processor 30, 40, and 50 utilizes conventional application program interfaces (APIs) 12, 14, and 16, respectively, that are specific to the particular software and/or firmware 32, 42, and 52, respectively.

The conventional congestion control application 22 is used to manage the congestion control and avoidance behavior of the conventional network processors 30, 40, and 50, respectively. The conventional congestion control application 22 thus includes a corresponding set of conventional behaviors 24, 26, and 28 for each set of the conventional APIs 12, 14, and 16, respectively. The conventional APIs 12, 14, and 16 are designed to communicate with the conventional behaviors 32, 42, and 52, respectively. The conventional APIs 12, 14, and 16 are also used to control the corresponding software and/or firmware 32, 42, and 52, respectively. Thus, using the conventional behaviors 24, 26, and 28 corresponding to the conventional APIs 12, 14, and 16, respectively, the conventional congestion control application 22 can control the congestion control and avoidance behavior of each of the conventional network processors 30, 40, and 50, respectively.

Although the conventional system 10 functions, one of ordinary skill in the art will readily recognize that the conventional system is difficult to scale. The conventional network processors 30, 40, and 50 are typically heterogeneous in nature. Because the conventional network processors 30, 40, and 50 are heterogeneous, the conventional network processors may include different versions of a particular model of network processor and/or different models of network processor. In addition, the congestion control and avoidance behavior of each conventional network processor 30, 40, and 50 may differ widely. Thus, the software and/or firmware 32, 42, and 52 of different network processors typically differ. The APIs 12, 14, and 16 thus also differ. Consequently, the corresponding behaviors 24, 26, and 28 of the conventional congestion control application 22 are distinct. One of ordinary skill in the art will also readily recognize that the conventional system 10 may actually include a large number of network processors. Consequently, the number of conventional APIs 12, 14, and 16 with which the conventional congestion control application 22 must be compatible may be large. As a result, the number of distinct conventional behaviors used by the conventional host processor 20 and developed by the owner of the conventional system 10, such as the conventional behaviors 24, 26, and 28, may be large. As a result, the congestion control application 22 may be complex and include an amalgamation of a variety of behaviors, one for each model and/or version of conventional network processor. It may thus be difficult to incorporate new network processors, which may have software and/or firmware and thus APIs not previously supported. The conventional system 10 is, therefore, difficult to scale. Because of difficulties in incorporating new software and/or firmware and their corresponding APIs, evolving the conventional congestion control application 22 and, therefore, the conventional system 10 to utilize improved network processors may be problematic. Furthermore, because supporting a variety of conventional behaviors 24, 26, and 28 makes the conventional congestion control application 22 more complex, the conventional system 10 may be subject to higher maintenance costs.

Accordingly, what is needed is a method for allowing a host to control congestion control and avoidance behavior of a network processor in a scalable, flexible manner. The present invention addresses such a need.

SUMMARY OF THE INVENTION

The present invention provides a method for managing congestion and avoidance behavior of network processors, the method comprising: providing for controlling network traffic by a plurality of network processors, a first of the plurality of network processors being of a different model or version from a second of the plurality of network processors; providing for a congestion control application being network processor independent such that the congestion control application need not have specific knowledge of a network processor's hardware, software, or firmware in order to manage the network processor's congestion and avoidance behavior; managing congestion and avoidance behavior of the plurality of network processors by a host processor having the congestion control application; and, providing for a plurality of application programming interfaces (APIs), each of the plurality of APIs being usable by the congestion control application of the host processor to manage the congestion and avoidance behavior of any of the plurality of network processors, none of the plurality of APIs being limited for use with a specific network processor model or version.

According to the method disclosed herein, the present invention provides a generic mechanism for managing the congestion control and avoidance behavior. As a result, a customer need not maintain a congestion control application having different sets of API for different types (e.g. models and/or versions) of network processors.

DETAILED DESCRIPTION OF THE INVENTION

The present invention relates to an improvement in computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method for controlling congestion control and avoidance behavior of a plurality of heterogeneous network processors in a network. The network also includes at least one host processor that utilizes at least one congestion control application. The method comprises providing a plurality of generic application program interfaces (APIs). The generic APIs communicate with the congestion control application(s) and the heterogeneous network processors. The generic APIs communicate with the congestion control application(s) in a network processor independent manner, but manage the congestion control and avoidance behavior of the heterogeneous network processors in a network processor specific manner. Thus, the generic APIs allow the congestion control application(s) to be network processor independent and to manage the congestion control and avoidance behavior of the heterogeneous network processors in the network processor specific manner.

The present invention will be described in terms of a particular computer system, a particular network processor, and certain APIs. However, one of ordinary skill in the art will readily recognize that this method will operate effectively for other computer system and network processors, as well as additional and/or other APIs. The present invention is also described in the context of a network including specific components and a particular number of components. However, one of ordinary skill in the art will readily recognize that the present invention is consistent with other networks containing other and/or additional components as well as another number of components. The present invention is also described in the context of congestion control and avoidance behavior. One of ordinary skill in the art will readily recognize that the term congestion control and avoidance denotes congestion control and/or avoidance.

Figure 2:
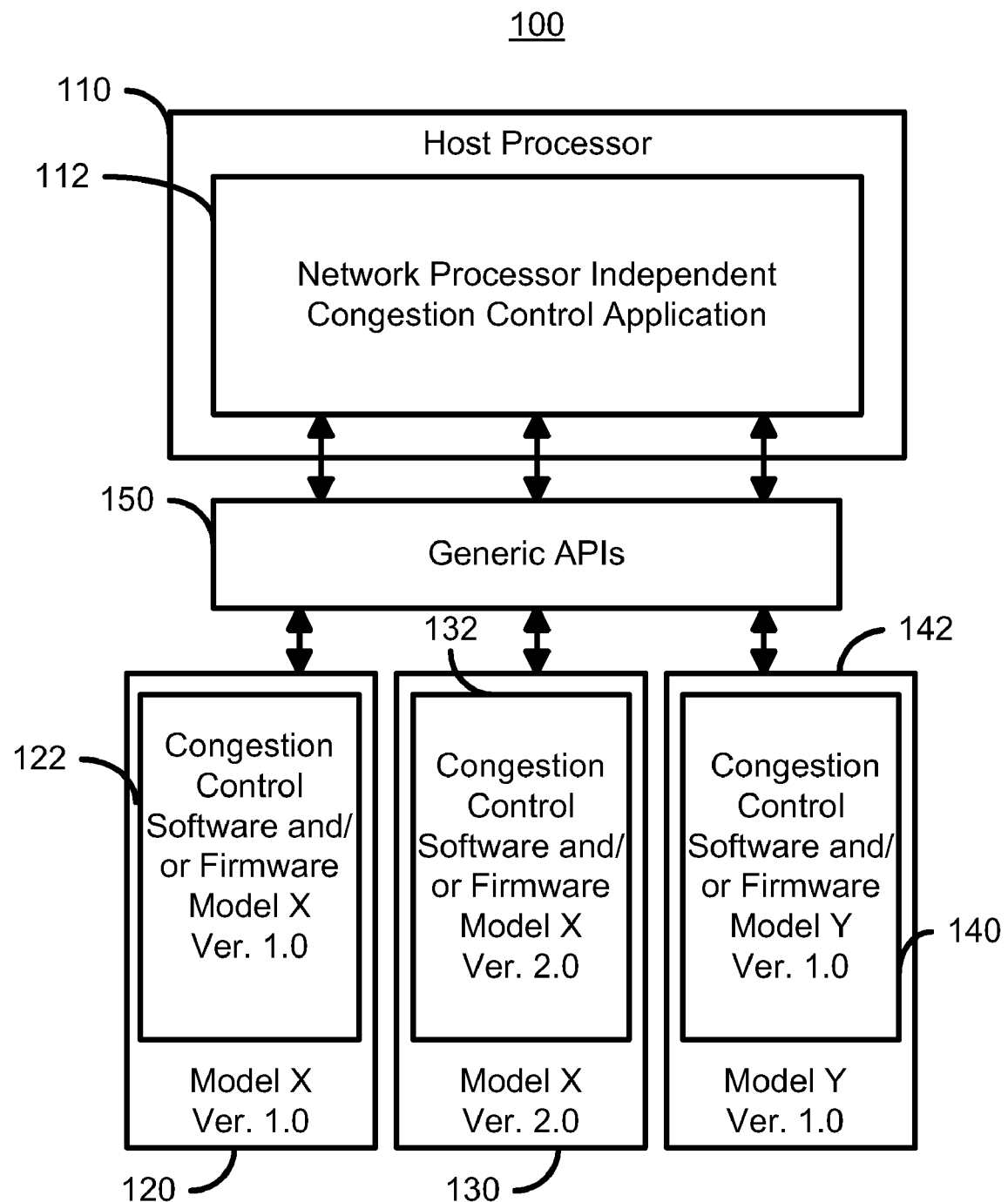
FIG. 2 is a diagram of one embodiment of a system in accordance with the present invention for managing congestion control and avoidance behavior of network processors.

To more particularly illustrate the method in accordance with the present invention, refer now to FIG. 2, depicting one embodiment of a system 100 in accordance with the present invention for managing congestion control and avoidance behavior of network processors. The system 100 is depicted as including a host processor 110 and network processors 120, 130, and 140. The host processor 110 includes a congestion control application 112. The network processors 120, 130, and 140 include congestion control software and/or firmware 122, 132, and 142, respectively. However, one of ordinary skill in the art will readily recognize that the generic APIs 150 are of particular utility. In addition, the generic APIs 150 are depicted as a separate entity. However, one of ordinary skill in the art will readily recognize that the host processor 110 and network processors 120, 130, and 140 utilize the generic APIs 150 for communication and control.

Figure 1:
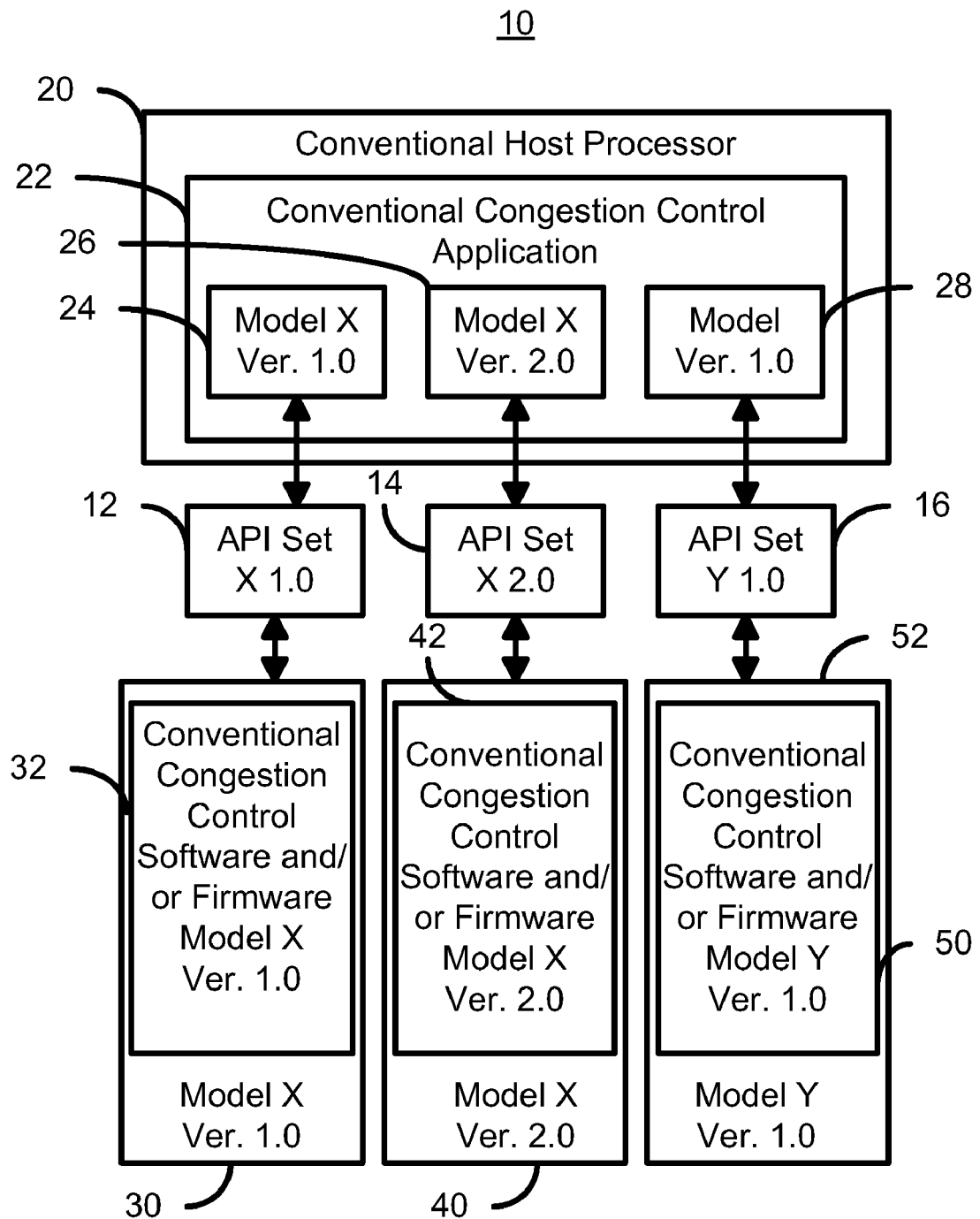
FIG. 1 is a diagram of a conventional system for managing congestion avoidance and control behavior of network processors.

The network processors 120, 130, and 140 are capable of being heterogeneous. Thus, the network processors 120, 130, and 140 may have hardware, software, and/or firmware for congestion control that differ significantly. For example, as depicted in FIG. 2, the software and/or firmware 122 for the network processor 120 is Model X, Version 1.0. In contrast, the network processor 130 includes software and/or firmware 132 that is Model X, Version 2.0. The network processor 140 is a completely different model, having software and/or firmware 142 that is Model Y, Version 1.0. Other network processors (not shown) having different models and/or versions may also be included. Because they are heterogeneous, in the absence of the present invention, the network processors 120, 130, and 140 would each require a separate network processor specific set of APIs in order to be controlled by a conventional congestion control application, such as the conventional congestion control application 12 depicted in FIG. 1.

Referring back to FIG. 2, the generic APIs 150 include APIs are used by the congestion control application 112 and the network processors 120, 130, and 140. In particular, the generic APIs communicate with and are used by the congestion control application 112 in a network processor independent manner. In other words, the congestion control application 112 is network processor independent. In the context of the present application, a network processor independent manner means that the congestion control application 112 need not contain knowledge of the specific hardware, software, and/or firmware 122, 132, and 142 of any of the network processors 120, 130, and 140, respectively, being controlled. At the same time, the congestion control application 112 can manage the congestion avoidance and control behavior of the network processors 120, 130, and 140 by managing the software and/or firmware 122, 132, and 142, respectively. Because the congestion control application 112 is network processor independent, the congestion control application 112 can configure and/or update the network processors 120, 130, and 140 without requiring specific knowledge of the hardware or software and/or firmware 122, 132, and 142, respectively of the individual network processors 120, 130, and 140, respectively.

The generic APIs 150 also communicate with and control the network processors 120, 130, and 140 in a network processor specific manner. In the context of the present application, network processor specific includes a knowledge of the specifics of a particular network processor, such as the hardware, software and/or firmware 122, 132, and 142, and possibly other components used by the particular network processor 120, 130, and 140, respectively. Thus, the APIs 150 allow the congestion control application 112 to be network processor independent while allowing each of the network processors 120, 130, and 140 to be control in a network processor specific manner.

Using the system 100, and more particularly the generic APIs 150, the congestion control application 112 can be network processor independent. Because of the use of the generic APIs, the congestion control application 112 can still control the potentially heterogeneous network processors 120, 130, and 140 in a network processor specific manner. As a result, the congestion control application 112, need not include a separate set of APIs for each type of network processor 120, 130, and 140 used. The congestion control application 112 is, therefore, simpler. As a result, it is significantly simpler to scale the system 100, including adding new types of network processors. It is thus also easier to improve the performance of the system 100 by adding improved network processors. In addition, the maintenance costs of the system 100 may be reduced due to the use of a simpler congestion control application 112.

Figure 3:
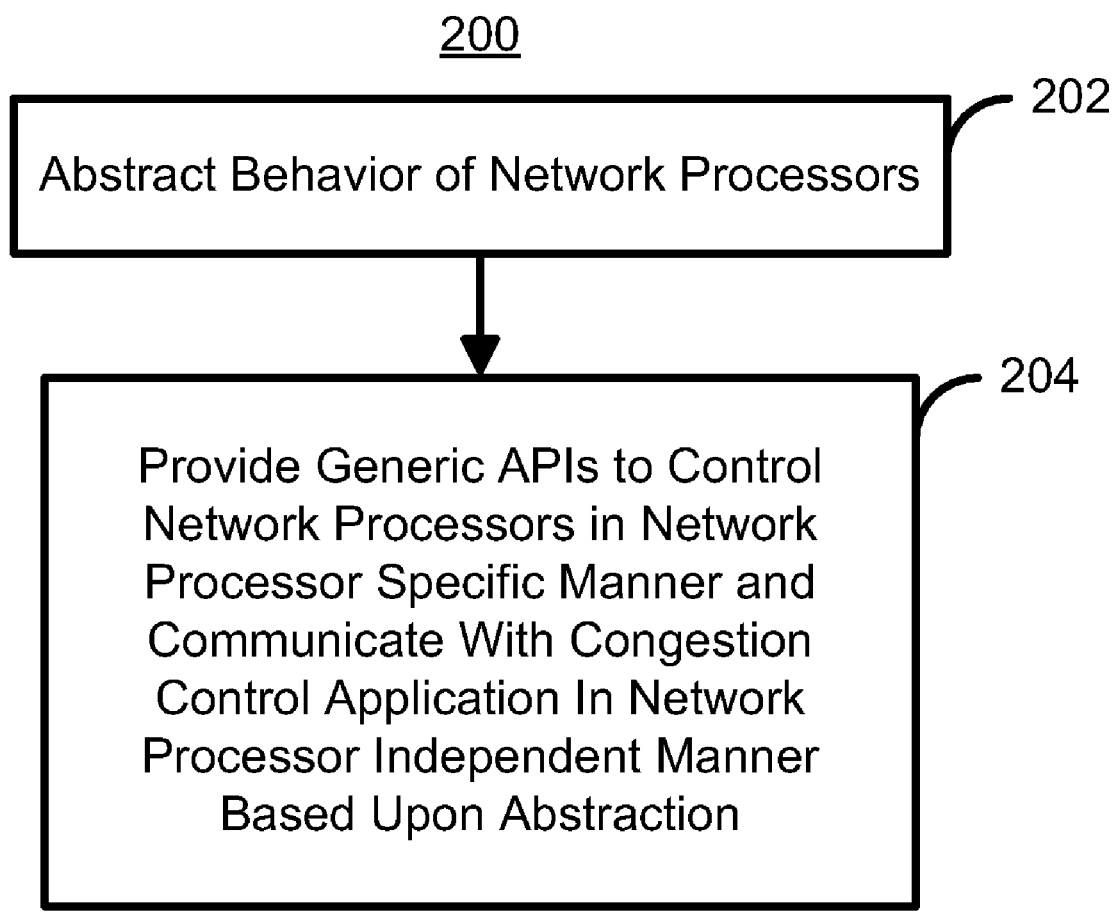
FIG. 3 is a high-level flow chart depicting one embodiment of a method in accordance with the present invention for providing a mechanism in accordance with the present invention for managing congestion control and avoidance behavior of network processors.

FIG. 3 is a high-level flow chart depicting one embodiment of a method 200 in accordance with the present invention for providing a mechanism in accordance with the present invention for managing congestion and control behavior of network processors. The method 200 is described in the context of the system 100 depicted in FIG. 2. In particular, the method 200 may be used to determine the generic APIs 150. Referring to FIGS. 2 and 3, the congestion control application 112 can then be developed in a network processor independent manner using the generic APIs 150. Similarly, the network processors 120, 130, and 140, which may be heterogeneous, have components such as software and/or firmware 122, 132, and 142, respectively, that can be managed by the generic APIs 150 in a network specific manner. The network processors 120, 130, and 140 may thus be controlled in a network processor specific manner using the generic APIs 150.

The congestion control and avoidance behavior of network processors, such as the network processors 120, 130, and 140, is abstracted, via step 202. Each network processor 120, 130, and 140 performs congestion control and avoidance in a specific manner. Step 202 abstracts the congestion control and avoidance behavior of network processors to a more general level. For example, step 202 includes determining the locations at which network processor might manage congestion.

Figure 4:
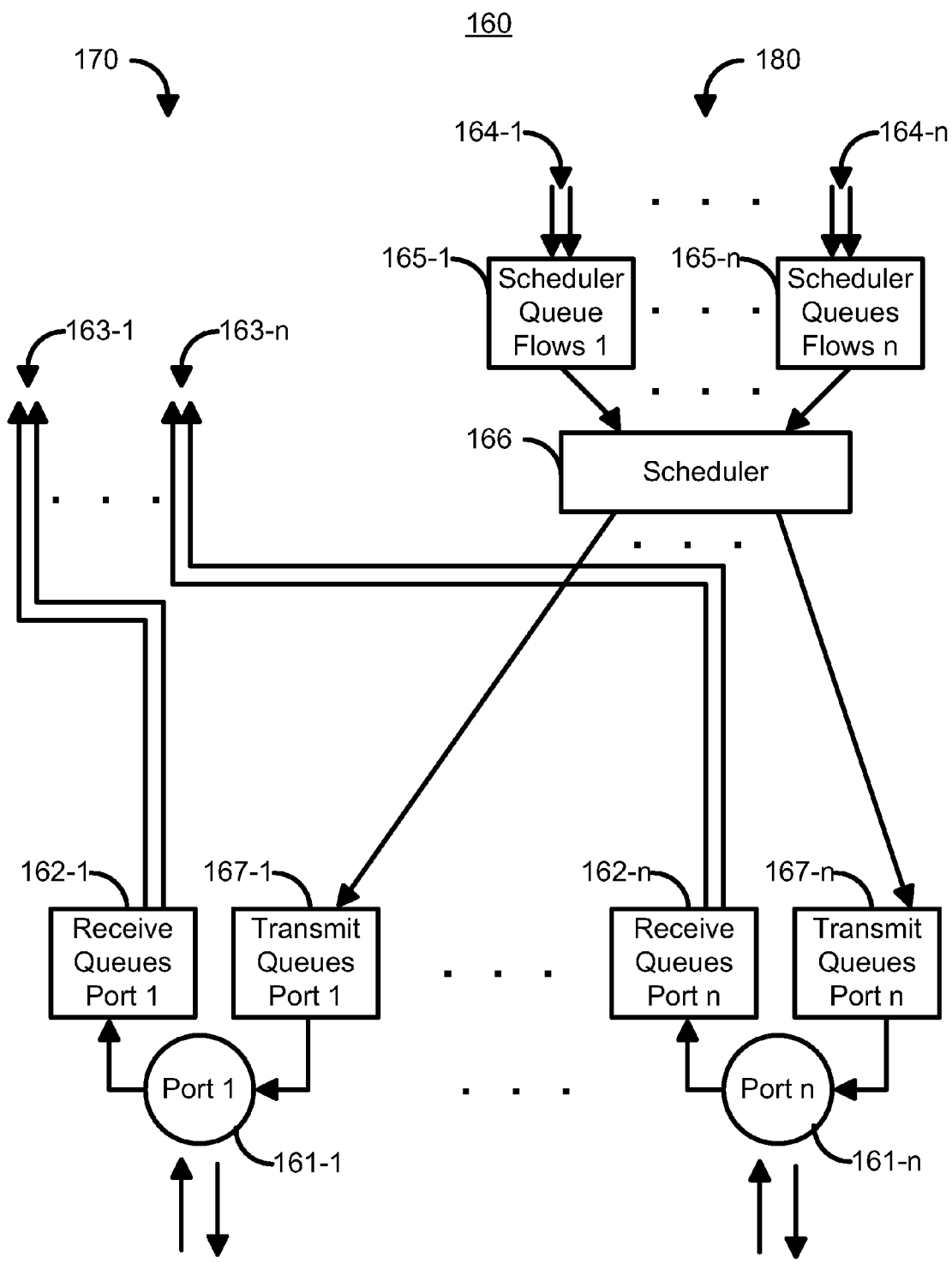
FIG. 4 is a block diagram depicting one embodiment of a network processor indicating locations in the network processor in which the system in accordance with the present invention might manage congestion control and avoidance behavior.

For example, FIG. 4 is a block diagram depicting a generalized view of one embodiment of a network processor 160 indicating locations in the network processor in which the system in accordance with the present invention might manage congestion control and avoidance behavior. Referring to FIGS. 2-4, any of the network processors 120, 130, and 140 might be represented by the network processor 160. The network processor 160 is obtained by abstracting the congestion control and avoidance behavior of the network processors 120, 130, and 140 in step 202. In particular, the network processor 160 indicates the locations in a network processor at which congestion control and avoidance might be managed. The network processor 160 thus includes an ingress side 170 and an egress side 180. The ingress side 170 includes ports 161-1 to 161-$n$ for the network processor 160 having n ports. Note that the egress side 180 also includes ports 161-1 to 161-$n$. The ingress side 170 also includes receive queues 162-1 to 162-$n$ where received packets are queued and receive flows 163-1 to 163-$n$. Note that although only two receive flows 163-1 to 163-$n$ are shown from receive queues 162-1 and 163-$n$, respectively, there are generally multiple flows from each set of receive queues 162-1 to 162-$n$, respectively. The egress side 180 includes the scheduler queue flows 164-1 to 164-$n$, the scheduler queues 165-1 to 165-$n$, the scheduler 166, the transmit queues 167-1 to 167-$n$, and the ports 161-1 to 161-$n$. Note that although only two scheduler flows 164-1 to 164-$n$ are shown for scheduler queues 165-1 and 165-$n$, respectively, there are generally multiple flows to each scheduler queue 165-1 to 165-$n$, respectively. Congestion avoidance and control behavior might be managed at any of the ports 161-1 to 161-$n$ (on either the ingress or egress side), the receive queues 162-1 to 162-$n$, the receive flows 163-1 to 163-$n$, the scheduler flows 164-1 to 164-$n$, the scheduler queues 165-1 to 165-$n$, the scheduler 166, and the transmit queues 167-1 to 167-$n$. Thus, in one embodiment of the general network processor 160, there are seven locations at which congestion control and avoidance might be managed. However, most network processors 120, 130, and 140 actually manage congestion at some of these locations. Thus, through step 202 of the method 200, the locations 161-1 to 161-$n$, 162-1 to 162-$n$, 163-1 to 163-$n$, 164-1 to 164-$n$, 165-1 to 165-$n$, 166-1 to 166-$n$, and 167-1 to 167-$n$, are identified.

Other aspects of a network processor are preferably also abstracted in step 202. For example, the types of congestion control algorithms that could be applied at the locations 161-1 to 161-$n$, 162-1 to 162-$n$, 163-1 to 163-$n$, 164-1 to 164-$n$, 165-1 to 165-$n$, 166-1 to 166-$n$, and 167-1 to 167-$n$ could also be identified in step 202. The type of algorithm applied may depend upon the location 161-1 to 161-$n$, 162-1 to 162-$n$, 163-1 to 163-$n$, 164-1 to 164-$n$, 165-1 to 165-$n$, 166-1 to 166-$n$, and 167-1 to 167-$n$ at which an algorithm is desired to be applied. For example, a Bandwidth Allocation Technology (BAT) algorithm (not explicitly shown) might control congestion at the input ports 161-1 to 161-$n$. Packets arriving at each port 161-1 to 161-$n$ are regarded as one flow. The BAT algorithm computes the corresponding transmit probabilities and discards packets accordingly. The algorithm generally applies only when congestion is sensed by the congestion control hardware unit (not explicitly shown) in the network processor 160. BAT can preferably be enabled or disabled on a per port basis. Certain congestion control algorithms operate on the receive queues 162-1 to 162-n. For example, the Random Early Discard (RED) algorithm might be applied at one or more of the receive queues 162-1 to 162-n. The RED algorithm uses the weighted average queue length as a feedback mechanism to decide on when to drop packets. When the weighted average queue length is between two configured thresholds, the RED algorithm typically drops packets depending on a calculated probability. The RED algorithm relies on the responsive nature of the end protocols to prevent congestion. Many congestion control algorithms might operate on flows 163-1 to 163-n, such as those based on DiffServ flows. A coloring algorithm (srTCM, trTCM, BAT) first meters the flows 163-1 to 163-n. A discard algorithm (such as BAT) uses the metered color and dynamically computed transmit probabilities to make discard decisions for each of the flows 163-1 to 163-n. Algorithms like Flow Random Early Discard (FRED) might also operate on the flows 163-1 to 163-n. Algorithms such as FRED might also operate on the scheduler flows 164-1 to 164-n. Similarly, some network processors may support the operation of algorithms such as RED and WRED on the scheduler queues 165-1 to 1656-n and/or on the transmit queues 166-1 to 166-n. Thus, step 202 abstracts network processors, such as the network processors 120, 130, and 140, in the context of congestion control and avoidance.

The generic APIs 150 are defined using the abstraction provided, via step 204. Thus, step 204 provides the generic APIs 150 that can preferably manage congestion control and avoidance behavior at any of the locations 161-1 to 161-n, 162-1 to 162-n, 163-1 to 163-n, 164-1 to 164-n, 165-1 to 165-n, 166-1 to 166-n, and 167-1 to 167-n. Furthermore, step 204 provides the APIs such that the individual network processors 120, 130, and 140 can be managed at the appropriate location(s) in the network processors 120, 130, and 140, respectively, corresponding to one or more of the of the locations 161-1 to 161-n, 162-1 to 162-n, 163-1 to 163-n, 164-1 to 164-n, 165-1 to 165-n, 166-1 to 166-n, and 167-1 to 167-n. The generic APIs 150 provided in step 204 can also be used to control other aspects of the network processors 120, 130, and 140 in a network processor specific manner. Furthermore, where a particular operation is not supported by a particular network processor 120, 130, and 140, the generic APIs 150 account for this by providing a null behavior to the congestion control application 112.

Step 204 also provides the generic APIs 150 such that the APIs can be used with a network processor independent congestion control application 112. Thus, using the method 200, the generic APIs 150 can be provided. The network processor independent congestion control application 112, as well as the network processors 120, 130, and 140 can be developed to utilize the generic APIs 150.

In a preferred embodiment, the generic APIs 150 include at least APIs for configuring and updating the congestion control and avoidance behavior of each of the network processors 110, 120, and 130 in a network processor specific manner. The generic APIs 150 preferably include APIs for enabling and disabling congestion control and behaviors, as well as APIs for listing information relating to congestion control and avoidance in the network and, more specifically, for the network processors 110, 120, and 130. In addition to controlling the network processors 110, 120, and 130 in a network processor specific manner, the APIs 150 preferably also return a null behavior for a particular function that is not implemented by a particular network processor.

The APIs of the generic APIs 150 that are used to configure and update the congestion avoidance and control behavior preferably determine the location(s) in each of the network processors 120, 130, and 140 at which congestion control and avoidance is to be managed. For example, as discussed below with respect to FIGS. 3 and 4, the configure and update APIs preferably indicate whether congestion control and avoidance is to be applied at the ingress, egress, particular port(s), particular queue(s), and particular flow(s). The configure and update APIs of the generic APIs 150 may also specify information used by the congestion control algorithm(s) used by the network processors 120, 130, and 140. In one embodiment, the configure and control APIs may indicate the congestion control algorithm, such as BAT or RED that is used by a particular network processor 120, 130, or 140 one or more locations.

In a preferred embodiment, the generic APIs 150 include five APIs: configure, update, enable, disable, and list. In a preferred implementation of the generic APIs, including the configure, update, enable, disable, and list APIs, parameters and fields are specified. Table 1 describes a preferred embodiment of the fields used.

TABLE 1

| Field Name | Field Description |
| --- | --- |
| CBS | Committed Burst Size. This is used by the srTCM and trTCM algorithms to meter flows. |
| cc_discard | Specifies the algorithm used to discard packets. |
| cc_entity | Indicates the point of the network element where congestion control should operate (Port, Queue, Flow) |
| cc_meter | Specifies the algorithm used to meter or color flows. |
| cc_point | Indicates whether congestion control should apply at the ingress entities or egress entities. WEST supports congestion control only at ingress entities. |
| $C_i$ | Coefficient of increase for BAT flows. |
| CIR | Committed Information Rate. This is used by the srTCM and trTCM algorithms to meter flows. |
| $D_i$ | Coefficient of decrease for BAT flows. |
| Discard Area | The area containing parameters for the discard algorithm. Example of a discard algorithms is BAT. |
| Discard Information Area | Area containing the parameters of the discard algorithm that is chosen via cc_discard. |
| EBS | Excess Burst Size. This is used by the srTCM algorithm to meter flows. |

TABLE 1-continued

| Field Name | Field Description |
|---|---|
| Error Area Size | Indicates the size (in words) of the parameter area associated with error operation. |
| Error Code | Indicates the Error code that is sent with error operation. |
| Error Queue Number | Indicates the error queue number associated with this port. If discard error packet is set to yes, this queue will be set to 0x3F to discard error packets. |
| Flowid | A 16 bit flow identifier value. |
| Invoke ID | A field used by the Service Requestor to correlate invocations with responses. |
| Length of Common Discard Area | Length of the Common Discard Area. This area contains discard information that is common across all flows, ports or queues. |
| Length of Common Meter Area | Length of the Common Meter Area. This area contains meter information that is common across all flows, ports or queues. |
| Length of Discard Area | Length of the Discard Area. |
| Length of Meter Area | Length of the Meter Area. |
| max_p | Maximum probability of performing a RED drop. |
| max_th | Maximum queue threshold for the RED algorithm. |
| $Max_i$ | Maximum BAT bandwidth for flow i. |
| $Max_i$ Override | This value overrides the $Max_i$ values for all BAT flows. |
| Meter Area | The area containing parameters for the metering algorithm. Examples of metering algorithms are srTCM, trTCM and BAT. |
| min_th | Minimum queue threshold for the RED algorithm. |
| $Min_i$ | Minimum BAT bandwidth for flow i. |
| $Min_i$ Override | This value overrides the $Min_i$ values for all BAT flows. |
| MO | This is the value for meter over-ride. In some cases, the metering algorithm can be controlled on a per-flow basis. If this value is non-zero, the specified meter algorithm is to be used for this flow. Else, the cc_meter value in the header is to be used to select the metering algorithm. |
| No: of fields updated in the common discard area | Number of fields in the common discard area that are to be updated |
| No: of fields updated in the common meter area | Number of fields in the common meter area that are to be updated |
| No: of flows updated | Number of flows whose parameters are to be updated. This field is present for updating both the meter info area and the discard info area. |
| No: of ports configured | Number of ports for which configuration parameters are specified in this packet. |
| num_ids | Number of identifiers that follow. The 16-bit identifiers can be port numbers, flow numbers or queue numbers - this depends on the algorithm in use. This is used for enabling, disabling and listing parameters of the various congestion control algorithms. If the value of this parameter is zero, then it means that parameters for all the identifiers (ports, queues or flows) for this algorithm are to be enabled/disabled/listed. |
| Operation Class | Indicates the conditions under which a response is to be sent to the Service Requestor. |
| Operation Code | Indicates the operation whose invocation is being requested. |
| Operation Version | Indicates the version level of the operation. |
| Parameter Area Size | Indicates the size (in words) of the parameter area associated with this operation. |
| PBS | Peak Burst Size. This is a parameter used by the trTCM algorithm to meter flows. |
| PIR | Peak Information Rate. This is a parameter used by the trTCM algorithm to meter flows. |
| Port No: | Configuration parameters for this port number are present in the following fields. |
| Port Number | Indicates the instance of the port type being operated upon. WEST supports a maximum of 32 possible ports. |
| Result Area Size | Indicates the size (in words) of the parameter area associated with result operation. |
| rxq_num | Indicates the receive queue associated with this algorithm. This is used for configuring queue-based congestion control mechanisms like RED. |
| Service Element Type | Indicates the nature of service. The possible values are: API-INVOKE, API-RESULT or API-ERROR. |
| Shock Absorber constant | Shock Absorber constant for BAT. |
| w_qlen | Weighting factor for calculating the average queue length for the RED algorithm. |

Some portion of the above fields are preferably used by the generic APIs 150 for performing different operations, such as configuring and invoking different types of congestion control at various points in the network processor. Note, however, that an alternate embodiment might use additional and/or other fields having other uses.

In order to utilize the generic APIs, a common four-word header (not shown) for congestion control services is preferably used. The first two words of the header are preferably common to congestion control software and/or firmware 122, 132, and 142. The last two words are preferably common to all congestion algorithms that can be used, such as RED and DiffServ. Table 2 describes the uses of various fields in the header. However, in an alternate embodiment, another scheme including other fields could be used.

TABLE 2

| Field Name | Bit | Word | Value | Remarks |
|---|---|---|---|---|
| Service Element Type | 02...03 | 0 | 0b00 | API-INVOKE |
|  |  |  | 0b01 | API_RESULT |
|  |  |  | 0b10 | API_ERROR |
| Operation Class | 6...7 | 0 | 0b00 | Report results and errors |
|  |  |  | 0b01 | Report results only |
|  |  |  | 0b10 | Report errors only |
|  |  |  | 0b11 | Do not report |
| Invoke ID | 16...31 | 0 | X | Any value specified by Service Requestor |
| Operation Version | 0...3 | 1 | 0x0-0xF | Value must match software level |
| Operation Code | 4...15 | 1 | 0x0C10 | IFS_Congestion_Config operation |
|  |  |  | 0x0C11 | IFS_Congestion_Updata operation |
|  |  |  | 0x0C12 | IFS_Congestion_Enable operation |
|  |  |  | 0x0C13 | IFS_Congestion_Disable operation |
|  |  |  | 0x0C14 | IFS_Congestion_List operation |
| Parameter Area Size | 16...31 | 1 |  | Size in Words starting from Word 2 |
| cc_point | 0...1 | 2 | 0x0 | Ingress |
|  |  |  | 0x1 | Egress |
|  |  |  | 0x2-0x3 | Reserved |
| cc_entity | 8...15 | 2 | 0x0 | Port |
|  |  |  | 0x1 | Queue |
|  |  |  | 0x2 | Flow |
|  |  |  | 0x3-0x7 | Reserved |
| cc_meter | 24...31 | 2 | 0x0 | srTCM (color blind) |
|  |  |  | 0x1 | srTCM (color aware) |
|  |  |  | 0x2 | trTCM (color blind) |
|  |  |  | 0x3 | trTCM (color aware) |
|  |  |  | 0x4 | BAT |
|  |  |  | 0x5 | NULL |
|  |  |  | 0x6...0xFF | User Defined |
| cc_discard | 24...31 | 3 | 0x0 | BAT |
|  |  |  | 0x1 | RED |
|  |  |  | 0x2 | WRED |
|  |  |  | 0x3 | SARED |
|  |  |  | 0x4 | FRED |
|  |  |  | 0x5-0xFF | User Defined |

As its name implies, the configure API is used to allow the congestion control application 112 (as utilized by a user such as a network administrator) to configure the congestion control and avoidance behavior in a network processor independent manner, yet operate on the network processors 120, 130, and 140 to configure the congestion control and avoidance behavior in a network processor specific manner. Note that the values of various parameters and fields depends upon, among other factors, the point at which congestion control and avoidance behavior is to be configured as well as the algorithm used. The parameters used by a preferred embodiment of the configure API are described below in Table 3.

TABLE 3

| Parameter Name | Value | Remarks |
|---|---|---|
| CC_Point | Ingress | The NP side at which congestion control configuration applies. |
|  | Egress |  |
| CC_Entity | Port | A Port is specified by Port Number |
|  | Queue | A Queue is specified by a Queue Id |
|  | Flow | A Flow is specified by a Flow Id |
| CC_Meter | srTCM (color blind) | The additional parameters that srTCM is associated with are: Committed Information Rate (CIR), Committed Burst Size (CBS), Excess Burst Size (EBS). srTCM applies to Flows only. |
|  | srTCM (color aware) |  |

TABLE 3-continued

| Parameter Name | Value | Remarks |
|---|---|---|
|  | trTCM (color blind) | The additional parameters that trTCM is associated with are: Comitted Information Rate (CIR), Committed Burst Size (CBS), Peak Burst Size (PBS) and Peak Information Rate (PIR). trTCM applies only to Flows. |
|  | trTCM (color aware) |  |
|  | BAT | The additional parameters that BAT is associated with are: Max-i, Min-i, Shock Absorber Constant, Di and Ci. BAT metering applies only to Flows. |

TABLE 3-continued

| Parameter Name | Value | Remarks |
|---|---|---|
| CC_Discard | BAT | BAT is associated with Max-i, Min-i, Shock Absorber Constant, Ci and Di. BAT discard is applicable for Ports and Flows. |
| | RED | RED is associated with w_qlen, max_th, min_th, max_p. RED is applicable for Queues only. |
| | WRED SARED FRED Vendor Specific | The additional parameters associated with WRED, FRED and SARED have not been defined in this invention. |

The update API allows the congestion control application 112 (as utilized by a user such as a network administrator) to update the congestion control and avoidance behavior in a network processor independent manner, yet operate on the network processors 120, 130, and 140 to update the congestion control and avoidance behavior in a network processor specific manner. In a preferred embodiment, the update API allows a bit field flag to be specified for each field. If the flag is set, the field value is sent with update service. Also in the preferred embodiment, the field ordering is consistent. Note that the values of various parameters and fields depends upon, among other factors, the point at which congestion control and avoidance behavior is to be updated as well as the algorithm used. The parameters used by a preferred embodiment of the update API are described below in Table 4.

TABLE 4

| Parameter Name | Metering Algorithm | Additional Parameters |
|---|---|---|
| CC_Meter | srTCM (color blind) srTCM (color aware) | The modifiable parameters that srTCM is associated with are: Committed Information Rate (CIR), Committed Burst Size (CBS), Excess Burst Size (EBS). srTCM applies to Flows only and the parameters must be associated with a Flow Id. |
| | trTCM (color blind) trTCM(color aware) | The modifiable parameters that trTCM is associated with are: Comitted Information Rate (CIR), Committed Burst Size (CBS), Peak Burst Size (PBS) and Peak Information Rate (PIR). trTCM applies only to Flows and the parameters must be associated with a Flow Id. |
| | BAT | The modifable parameters that BAT is associated with are: Max-i, Min-i, Shock Absorber Constant, Di and Ci. BAT metering applies only to Flows and the parameters must be associated with a Flow Id. |
| CC_Discard | BAT | The modifable parameters that BAT is associated with are: Max-i, Min-i, Shock Absorber Constant, Ci and Di. BAT discard is applicable for Ports and Flows. Therefore all updates must be associated with a Port Number or a Flow Id. |
| | RED | The modifable parameters that RED is associated with are: w_qlen, max_th, min_th, max_p. RED is applicable for Queues only. Therefore all parameters must be associated with a Queue Id. |
| | WRED SARED FRED Vendor Specific | The modifiable parameters associated with WRED, FRED and SARED have not been defined in this invention. |

The enable API allows the congestion control application 112 (as utilized by a user such as a network administrator) to enable selected algorithms for congestion control and avoidance behavior in a network processor independent manner, yet operate on the network processors 120, 130, and 140 to enable the algorithm(s) for a particular processor's 120, 130, or 140 congestion control and avoidance behavior in a network processor specific manner. For example, the enable API can be used to enable specific algorithm(s) at certain ports (for the ingress and/or egress side) and/or flows. Note that the values of various parameters and fields depends upon, among other factors, the point at which congestion control and avoidance behavior is to be enabled as well as the algorithm used. The parameters used by a preferred embodiment of the enable API are described below in Table 5.

TABLE 5

| Parameter Name | Value | Remarks |
|---|---|---|
| CC_Point | Ingress Egress | The NP side at which congestion control configuration applies. |
| CC_Entity | Port | A Port is specified by Port Number |
| | Queue | A Queue is specified by a Queue Id |
| | Flow | A Flow is specified by a Flow Id |
| Number Of Instances | $0 \ldots 2^{16}$ | A value of zero implies all instances of the CC_Entity at the specified CC_Point. |
| List of Instance Ids | Instance $Id_0 \ldots$ Instance $Id_n$ | A list of instances of the specified CC_Entity for which the configured congestion control/avoidance algorithm is required to be enabled. |

The disable API allows the congestion control application 112 (as utilized by a user such as a network administrator) to deactivate selected algorithms for congestion control and avoidance behavior in a network processor independent manner, yet operate on the network processors 120, 130, and 140 to disable the algorithm(s) for a particular processor's 120, 130, or 140 congestion control and avoidance behavior in a network processor specific manner. For example, the enable API can be used to disable specific algorithm(s) at certain ports (for the ingress and/or egress side) and/or flows. Note that the values of various parameters and fields depends upon, among other factors, the point at which congestion control and avoidance behavior is to be disabled as well as the algorithm used. The parameters used by a preferred embodiment of the disable API are described below in Table 6.

TABLE 6

| Parameter Name | Value | Remarks |
| --- | --- | --- |
| CC_Point | Ingress<br>Egress | The NP side at which congestion control configuration applies. |
| CC_Entity | Port | A Port is specified by Port Number |
| | Queue | A Queue is specified by a Queue Id |
| | Flow | A Flow is specified by a Flow Id |
| Number Of Instances | $0 \ldots 2^{16}$ | A value of zero implies all instances of the CC_Entity at the specified CC_Point. |
| List of Instance Ids | Instance $Id_0 \ldots$ Instance $Id_n$ | A list of instances of a the specified CC_Entity for which the configured congestion control/avoidance algorithm is required to be disabled. |

The list API allows the congestion control application 112 (as utilized by a user such as a network administrator) to be used to view the congestion control and avoidance information for any of the network processors in a network processor independent manner. The list API obtains this information for viewing from the network processors 120, 130, and 140 in a network processor specific manner. For example, the information returned in response to the list API might contain metering and discard information, the current state (enabled/disabled) for the location(s) of each of the network processors 120, 130, and 140 from which the information is requested. Note that the values of various parameters and fields depends upon, among other factors, the algorithm used. The parameters used by a preferred embodiment of the disable API are described below in Table 7.

TABLE 7

| Parameter Name | Value | Remarks |
| --- | --- | --- |
| CC_Point | Ingress<br>Egress | The NP side at which congestion control configuration applies. |
| CC_Entity | Port | A Port is specified by Port Number |
| | Queue | A Queue is specified by a Queue Id |
| | Flow | A Flow is specified by a Flow Id |
| Number Of Instances | $0 \ldots 2^{16}$ | A value of zero implies all instances of the CC_Entity at the specified CC_Point. |
| List of Instance Ids | Instance $Id_0 \ldots$ Instance $Id_n$ | A list of instances of a the specified CC_Entity for which the configured congestion control/avoidance information is required to be provided. |

The definitions for the parameters listed above are shown in Table 6, below.

TABLE 8

| Field Name | Field Description |
| --- | --- |
| CBS | Committed Burst Size. This is used by the srTCM and trTCM algorithms to meter flows. |
| cc_discard | Specifies the algorithm used to discard packets. |
| cc_entity | Indicates the point of the network element where congestion control should operate (Port, Queue, Flow) |
| cc_meter | Specifies the algorithm used to meter or color flows. |
| cc_point | Indicates whether congestion control should apply at the ingress entities or egress entities. WEST supports congestion control only at ingress entities. |
| $C_i$ | Coefficient of increase for BAT flows. |
| CIR | Committed Information Rate. This is used by the srTCM and trTCM algorithms to meter flows. |
| $D_i$ | Coefficient of decrease for BAT flows. |
| EBS | Excess Burst Size. This is used by the srTCM algorithm to meter flows. |
| Flowid | A 16 bit flow identifier value. |
| max_p | Maximum probability of performing a RED drop. |
| max_th | Maximum queue threshold for the RED algorithm. |
| $Max_i$ | Maximum BAT bandwidth for flow i. |
| min_th | Minimum queue threshold for the RED algorithm. |
| $Min_i$ | Minimum BAT bandwidth for flow i. |
| PBS | Peak Burst Size. This is a parameter used by the trTCM algorithm to meter flows. |
| PIR | Peak Information Rate. This is a parameter used by the trTCM algorithm to meter flows. |
| Port Number | Indicates the instance of the port type being operated upon. A maximum of 32 ports is supported. |
| Shock Absorber constant | Shock Absorber constant for BAT. |
| w_qlen | Weighting factor for calculating the average queue length for the RED algorithm. |

Thus, in a preferred embodiment, the generic APIs 150 include the configure, update, enable, disable, and list APIs. The five generic APIs 150 preferably be used allow the congestion control application 112 to be network processor independent and still control the potentially heterogeneous network processors 120, 130, and 140 in a network processor specific manner. The congestion control application 112 is, therefore, simpler. As a result, it is significantly simpler to scale the system 100, including adding new types of network processors. It is thus also easier to improve the performance of the system 100 by adding improved network processors. In addition, the maintenance costs of the system 100 may be reduced due to the use of a simpler congestion control application 112.

Figure 5:
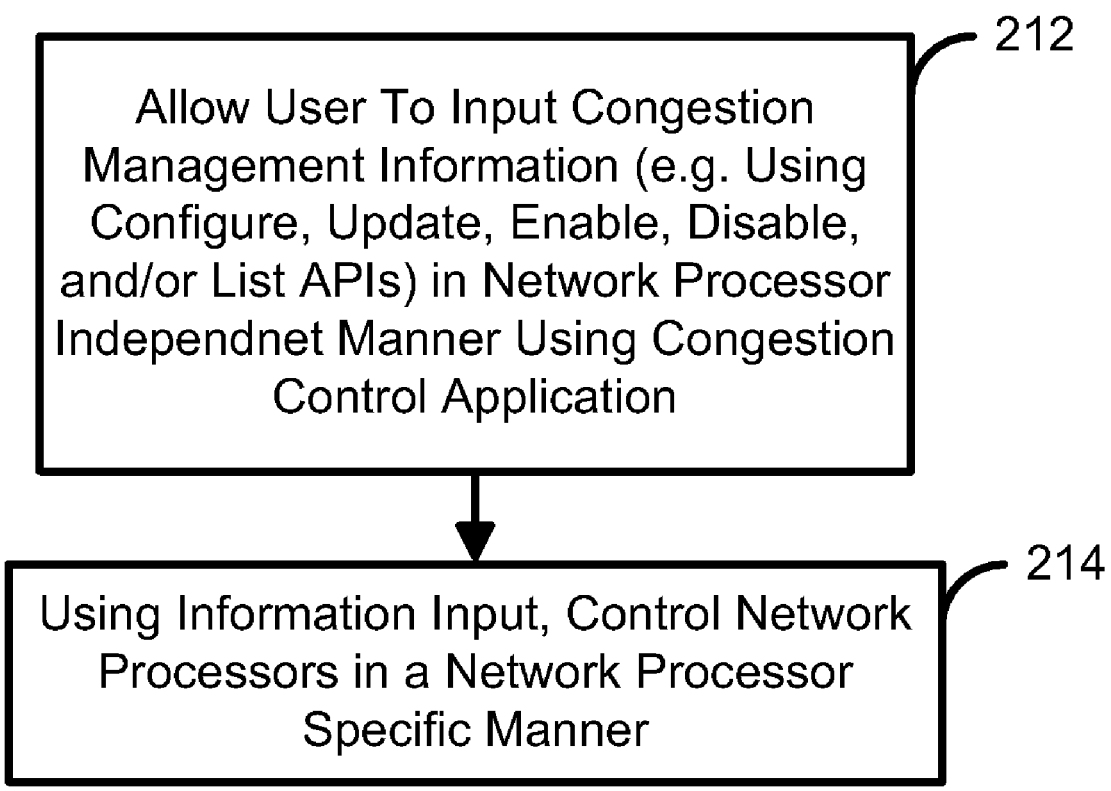
FIG. 5 is high-level flow chart of one embodiment of a method in accordance with the present invention for using a mechanism in accordance with the present invention for managing congestion control and avoidance behavior of network processors.

FIG. 5 is high-level flow chart of one embodiment of a method 210 in accordance with the present invention for using a mechanism in accordance with the present invention for managing congestion and control behavior of network processors. For clarity, the method 210 is described in conjunction with the system 100 depicted in FIG. 2. Referring to FIGS. 2 and 5, the method 210 presumes that the network processors 120, 130, and 140, as well as the congestion control application 112 have been configured for use with the generic APIs 112. For example, the congestion control application is network processor independent and has a generic interface appropriate for use with the generic APIs 112.

A user, such as a network administrator, is allowed to input information to manage the congestion control and avoidance behavior of the network processors 120, 130, and 140 using the generic APIs 150 in a network independent manner, via step 212. In step 212, therefore, a user might provide the identification of the network processor desired to be controlled, values of the appropriate parameters and flags, as well as other information used by the API(s) of the generic APIs being used. The generic APIs 150 are then used to control the possibly heterogeneous network processors 120, 130, and 140 in a network processor specific manner, via step 214.

Using the system 100, the methods 200 and 210, and more particularly the generic APIs 150, the congestion control application 112 can be network processor independent. Because of the use of the generic APIs, the congestion control application 112 can still control the potentially heterogeneous network processors 120, 130, and 140 in a network processor specific manner. As a result, the congestion control application 112 need not include a separate set of APIs for each type of network processor 120, 130, and 140 used. The congestion control application 112 is, therefore, simpler. As a result, it is significantly simpler to scale the system 100, including adding new types of network processors. It is thus also easier to improve the performance of the system 100 by adding improved network processors. In addition, the maintenance costs of the system 100 may be reduced due to the use of a simpler congestion control application 112.

A method has been disclosed for controlling the congestion control and avoidance behavior of heterogeneous network processors using a network processor independent control application. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing congestion and avoidance behavior of network processors, the method comprising:
    providing for controlling network traffic by a plurality of network processors, a first of the plurality of network processors being of a different model or version from a second of the plurality of network processors;
    providing for a congestion control application being network processor independent such that the congestion control application need not have specific knowledge of a network processor's hardware, software, or firmware in order to manage the network processor's congestion and avoidance behavior;
    managing congestion and avoidance behavior of the plurality of network processors by a host processor having the congestion control application; and,
    providing for a plurality of application programming interfaces (APIs), each of the plurality of APIs being usable by the congestion control application of the host processor, via a multi-word header of a plurality of words, to manage the congestion and avoidance behavior of any of the plurality of network processors, none of the plurality of APIs being limited for use with a specific network processor model or version, and
    using the multi-word header usable for congestion control, wherein the multi-word header is comprised of a plurality of words where a first part of the multi-word header consisting of a first plurality of words is common to a set of congestion control software located on the plurality of network processors and a second part of the multi-word header consisting of a second plurality of words is common to a plurality of congestion algorithms.

2. The method of claim 1, further comprising adding a new network processor model or version without modifying the congestion control application of the host processor.

3. The method of claim 1, further comprising the congestion control application of the host processor using the plurality of APIs to identify a location in one of the plurality of network processors where congestion and avoidance behavior is to be managed.

4. The method of claim 3, wherein the identified location in the one network processor includes an ingress side and an egress side.

5. The method of claim 4, wherein the ingress side of the identified location in the one network processor further includes a plurality of ports, a plurality of receive queues, and a plurality of receive flows.

6. The method of claim 4, wherein the egress side of the identified location in the one network processor further includes a plurality of scheduler flows, a plurality of scheduler queues, a plurality of transmit queues, and a plurality of ports.

7. The method of claim 3, further comprising the congestion control application of the host processor using the plurality of APIs to select a congestion control algorithm to apply at the identified location in the one network processor.

8. The method of claim 7, further comprising the plurality of APIs returning a null behavior to the congestion control application of the host processor when an operation is not supported or when a function is not implemented by the one network processor.

9. The method of claim 1, further comprising the plurality of APIs including a configure API, an update API, an enable API, a disable API, and a list API, the configure API being usable by the congestion control application of the host processor to configure the congestion and avoidance behavior of any of the plurality of network processors, the update API being usable by the congestion control application of the host processor to update the congestion and avoidance behavior of any of the plurality of network processors, the enable API being usable by the congestion control application of the host processor to enable congestion control algorithms for any of the plurality of network processors, the disable API being usable by the congestion control application of the host processor to disable congestion control algorithms for any of the plurality of network processors, and the list API being usable by the congestion control application of the host processor to view congestion and avoidance information concerning any of the plurality of network processors.

10. The method of claim 1, wherein each of the plurality of network processors resides in a switch or a router.

11. The method of claim 1, further comprising the plurality of network processors controlling network traffic on a plurality of networks.

12. The method of claim 1, further comprising the congestion and avoidance behavior of a network processor including how packets are handled by the network processor when the network processor is unable to process every packet during a particular interval.

* * * * *